(12) United States Patent
Fisher

(10) Patent No.: US 12,045,130 B2
(45) Date of Patent: Jul. 23, 2024

(54) MANAGING DATA INTEGRITY USING A CHANGE IN A NUMBER OF DATA ERRORS AND AN AMOUNT OF TIME IN WHICH THE CHANGE OCCURRED

(71) Applicant: Micron Technology, Inc., Boise, ID (US)

(72) Inventor: Ryan G. Fisher, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 141 days.

(21) Appl. No.: 17/831,086

(22) Filed: Jun. 2, 2022

(65) Prior Publication Data

US 2023/0393932 A1 Dec. 7, 2023

(51) Int. Cl.
*G06F 11/10* (2006.01)
*G06F 11/00* (2006.01)
*G06F 11/07* (2006.01)

(52) U.S. Cl.
CPC ...... *G06F 11/1048* (2013.01); *G06F 11/0757* (2013.01); *G06F 11/0793* (2013.01)

(58) Field of Classification Search
CPC ............ G06F 11/1048; G06F 11/0757; G06F 11/0793
See application file for complete search history.

(56) References Cited

U.S. PATENT DOCUMENTS

| | | | | |
|---|---|---|---|---|
| 7,958,301 B2* | 6/2011 | Sutardja | ............... | G06F 12/0246 714/704 |
| 8,429,492 B2* | 4/2013 | Yoon | ................... | G06F 11/1048 714/763 |
| 9,563,371 B2* | 2/2017 | Li | .......................... | G06F 3/0634 |
| 9,946,595 B2* | 4/2018 | Gilda | ................. | G06F 11/1068 |
| 10,896,123 B2* | 1/2021 | Yang | .................. | G06F 11/1068 |
| 11,194,473 B1* | 12/2021 | Zhao | ..................... | G06F 3/0647 |
| 11,287,998 B2* | 3/2022 | Muchherla | ............ | G06F 3/0679 |
| 2014/0136927 A1* | 5/2014 | Li | ....................... | G06F 11/1016 714/768 |

* cited by examiner

*Primary Examiner* — Justin R Knapp
(74) *Attorney, Agent, or Firm* — NICHOLSON DE VOS WEBSTER & ELLIOTT LLP

(57) ABSTRACT

Exemplary methods, apparatuses, and systems include performing an initial data integrity scan of a subset of memory at an initial time to determine an initial error rate for the subset of memory. The initial error rate and the initial time are stored. A subsequent integrity scan of the subset of memory is performed at a second time to determine a subsequent error rate for the subset of memory. A difference between the initial error rate and the subsequent error rate is determined. A difference between the initial time and the subsequent time is determined. A remedial action is selected using the difference between the initial error rate and the subsequent error rate and the difference between the initial time and the subsequent time and the remedial action is performed.

20 Claims, 4 Drawing Sheets

MANAGING DATA INTEGRITY USING A CHANGE IN A NUMBER OF DATA ERRORS AND AN AMOUNT OF TIME IN WHICH THE CHANGE OCCURRED

TECHNICAL FIELD

The present disclosure generally relates to the mitigation of data errors in a memory subsystem, and more specifically, relates to using a rate of change in the number of data errors in the management of data integrity.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
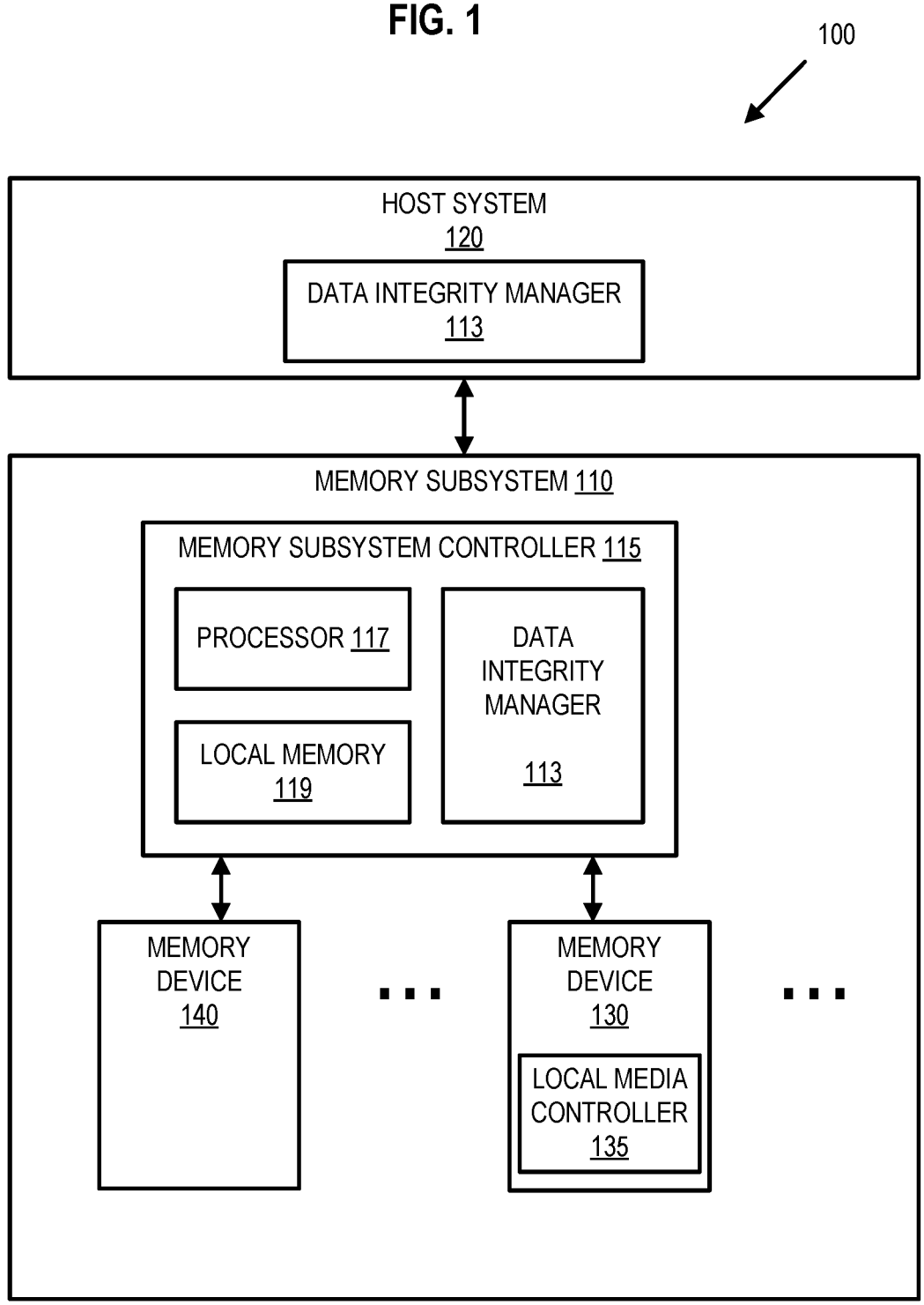
FIG. 1 illustrates an example computing system that includes a memory subsystem in accordance with some embodiments of the present disclosure.

Aspects of the present disclosure are directed to mitigating data errors in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Data reliability in a memory can degrade as the memory device increases in density (e.g., device components scale down in size, when multiple bits are programmed per cell, etc.). One contributor to this reduction in reliability is read disturb. Read disturb occurs when a read operation performed on one portion of the memory (e.g., a row of cells), often referred to as the aggressor, impacts the threshold voltages in another portion of memory (e.g., a neighboring row of cells), often referred to as the victim. Memory devices typically have a finite tolerance for these disturbances. A sufficient amount of read disturb effects, such as a threshold number of read operations performed on neighboring aggressor cells, can change the victim cells in the other/unread portion of memory to different logical states than originally programmed, which results in errors. Additionally, other parasitic effects, radiation, manufacturing defects, etc. can contribute to bit errors.

A host system or memory subsystem can proactively monitor data reliability by performing data integrity checks (e.g., reading data independent of user requests) and taking remedial action to address errors. For example, a host system can execute a read of a portion of memory to check the error rate or threshold voltage shift and, if the error rate or threshold voltage shift satisfies a threshold, program an error-corrected copy of the data back to memory. As increasing density of memory devices drives greater error rates, however, this limited amount of information on data integrity provides little to dynamically select remedial actions. For example, these data integrity checks can lack information to be used in prioritization of remedial actions or selection between remedial actions.

Aspects of the present disclosure address the above and other deficiencies by performing a data integrity check after a portion of memory is programmed and a subsequent data integrity check of the portion of memory to determine a change in a number of bit errors (e.g., bit error rate) and an amount of time elapsed between the data integrity checks. Using the change in bit error rate and time elapsed, the host system or memory subsystem can prioritize and/or select between different remedial actions. For example, a host system using these metrics can not only determine if the data is to be refreshed, but the relative priority of that refresh in comparison the refresh of other data. Similarly, the host system or memory subsystem can use these metrics to identify portions of memory that would benefit from a change in bit density (e.g., updating a portion of memory from QLC to SLC for increased reliability) or change in use (e.g., storing "hot data" that is often updated vs. storing "cold data" that is seldom updated). As a result of this data integrity management, the memory subsystem dynamically optimizes the use of the memory while increasing data reliability. This can also provide an improvement of memory subsystem quality of service (QoS) by reducing data integrity scans and error correction efforts.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a data integrity manager 113 that mitigates bit errors and otherwise manages data integrity in the memory subsystem 110. In some embodiments, the controller 115 includes at least a portion of the data integrity manager 113. For example, the controller 115 can include a processor 117 (processing device) configured to execute instructions stored in local memory 119 for performing the operations described herein. In some embodiments, a data integrity manager 113 is part of the host system 120, an application, or an operating system. In some embodiments, the memory subsystem 110 and the host system 120 each include portions of the data integrity manager 113.

The data integrity manager 113 can manage data integrity using a change in a number of data errors and an amount of time in which the change occurred. For example, the data integrity manager 113 can store an initial error rate and a time the initial rate is observed by performing a data integrity scan after a portion of memory is programmed. Upon a subsequent data integrity scan, the data integrity manager 113 can compare a subsequent error rate to the initial error rate and determine a difference in time between the scans. The data integrity manager 113 can use the change in error rate and change in time to select between and perform one or more remedial actions, if applicable. Further details with regards to the operations of the data integrity manager 113 are described below.

Figure 2:
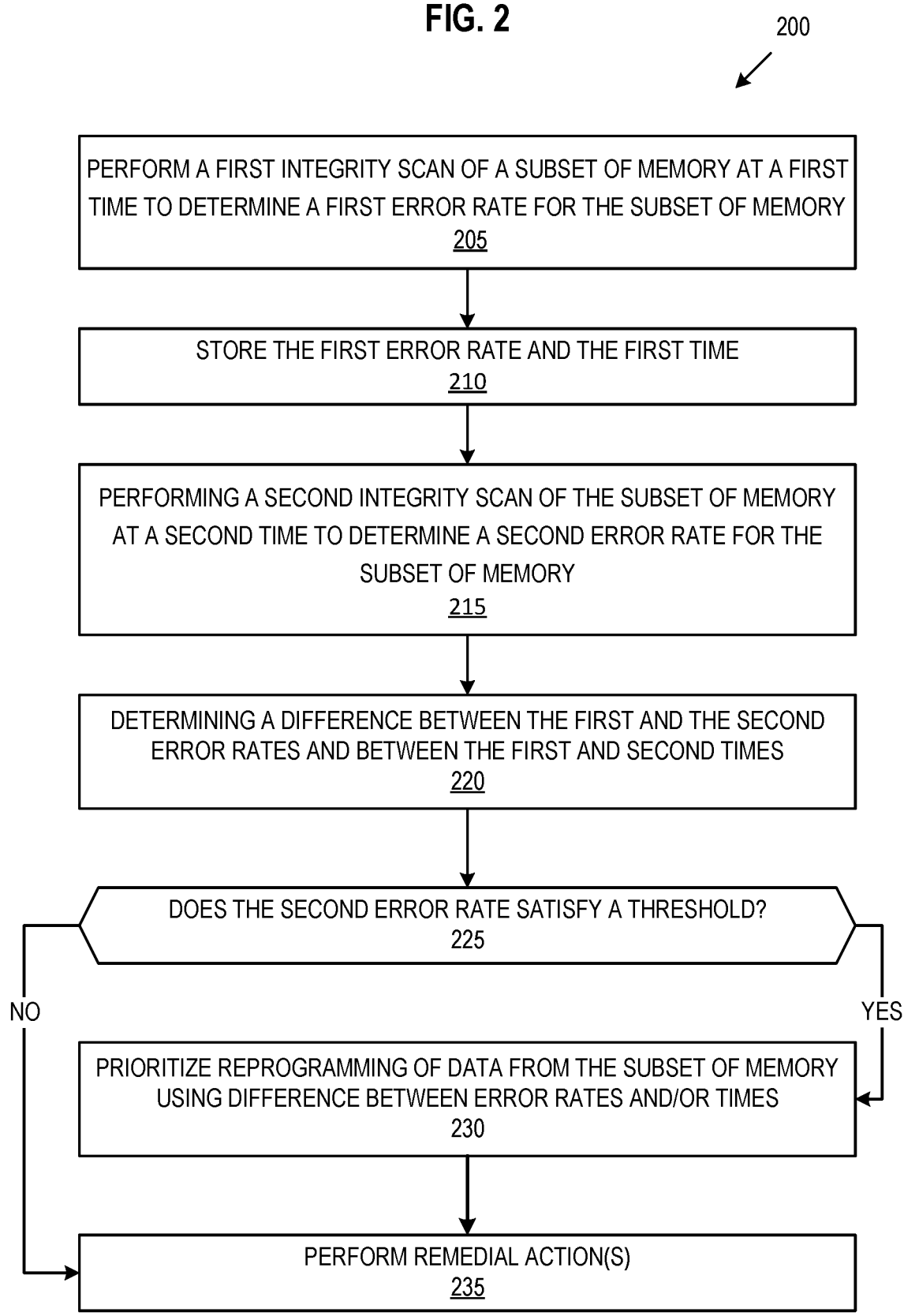
FIG. 2 is a flow diagram of an example method to manage data integrity using a change in a number of data errors and an amount of time in which the change occurred in accordance with some embodiments of the present disclosure.

FIG. 2 is a flow diagram of an example method 200 to manage data integrity using a change in a number of data errors and an amount of time in which the change occurred, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the data integrity manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device performs an initial data integrity scan of a subset of memory at an initial time to determine an initial error rate for the subset of memory. For example, the data integrity manager 113 can perform a read operation of a wordline, page, block, or other subset of memory 130 and generate a raw bit error rate (RBER) or other value representing a number of bits in error in the subset of memory 130 using parity data or another error detection indicator. In one embodiment, the data integrity manager 113 determines the number or fraction of bits that contain incorrect data prior to an attempt to correct bits in error.

In one embodiment, the data integrity manager 113 initiates the integrity scan in response to an elapsed amount of time following the memory subsystem 110 programming the wordline, page, block, or other subset of memory 130. In one embodiment, the data integrity manager 113 initiates the initial integrity scan in response to the earlier of: (1) detecting a level of activity below a threshold (e.g., an idle channel) following programming and (2) an elapsing of an amount of time following the programming (e.g., four hours of programming a block of memory).

At operation 210, the processing device stores the initial error rate and the initial data integrity scan time. For example, the data integrity manager 113 stores, in nonvolatile memory, an identifier of the subset of memory along with the initial error rate and a timestamp of the initial integrity scan.

At operation 215, the processing device performs a subsequent data integrity scan of the subset of memory. For example, the data integrity manager 113 can perform the subsequent integrity scan in response to an estimated read disturb effect on the subset of memory, on a probabilistic basis, upon the expiration of an amount of time following the initial integrity scan, or another trigger. The data integrity manager 113 determines a subsequent error rate for the subset of memory and, at least temporarily, stores the subsequent error rate and a time of the subsequent integrity scan.

At operation 220, the processing device determines a difference between the initial error rate and the subsequent error rate. For example, the data integrity manager 113 can subtract the initial bit error rate from the subsequent bit error rate to determine the increase or decrease in bit errors between data integrity scans.

Additionally, the processing device determines a difference between the first time and the second time. For example, the data integrity manager 113 can subtract the time of the initial data integrity scan from the time of the subsequent data integrity scan to determine the amount of time that elapsed (e.g., in days, hours, minutes, etc.) between data integrity scans.

At operation 225, the processing device determines if the subsequent bit error rate satisfies an error rate threshold. For example, the data integrity manager 113 can determine if the subsequent bit error rate for the subset of memory meets or exceeds an error rate threshold. In one embodiment, the error rate threshold represents a number of errors an error correction scheme can correct but one that is approaching an uncorrectable number of errors for the error correction scheme. If the subsequent bit error rate satisfies an error rate threshold, the method 200 proceeds to operation 230. Otherwise, the method 200 proceeds to operation 235.

At operation 230, the processing device sets a priority for reprogramming data from the subset of memory using the difference between the initial error rate and the subsequent error rate and/or the amount of time elapsed between data integrity scans. For example, the data integrity manager 113 can compare data integrity scan data for multiple subsets of memory. As one illustration, three QLC blocks can be the subject of data integrity scans, such that the following table provides the determinations of the data integrity manager 113:

| Subset of memory | Time elapsed between scans | Bit error rate | Change in error rate |
|---|---|---|---|
| QLC Block 150 | 5 days | 70 bits | 35-bit increase |
| QLC Block 250 | 1 day | 130 bits | 90-bit increase |
| QLC Block 350 | 4 days | 130 bits | 93-bit increase |

Using an error rate threshold of 100 bits, the data integrity manager 113 identifies both QLC Block 250 and QLC Block 350 as having bit error rates of 130 bits. Both QLC Block 250 and QLC Block 350 are above the error rate threshold and, therefore, flagged for reprogramming. QLC Block 150 has a bit error rate that does not satisfy the error rate threshold, so QLC Block 150 is not flagged for reprogramming. In further evaluating QLC Block 250 and QLC Block 350, the data integrity manager 113 can compare the 90-bit increase in error rate in one day for QLC Block 250 with the 93-bit increase in error rate in four days for QLC Block 350. While QLC Block 350 had a slightly larger increase in error rate, QLC Block 250 experienced a similar increase in only one day and, thus, is in greater risk of reaching an uncorrectable bit error rate. As a result, the data integrity manager 113 prioritizes the reprogramming of QLC Block 250 before the reprogramming of QLC Block 350. As a result, the data integrity manager 113 reduces the risk of QLC Block 250 reaching an uncorrectable bit error rate (or requiring a more resource-intensive error correction scheme).

In one embodiment, the data integrity manager 113 prioritizes the remedial actions of different subsets of memory using a rate of change in bit error rates (e.g., the change in bit error rate divided by the time elapsed between scans). For example, the data integrity manager 113 reprograms subsets of memory in a priority order from highest to lowest rates of change in bit error rates.

At operation 235, the processing device performs one or more remedial actions, if applicable, using one or more of the subsequent bit error rate, the difference between the first error rate and the second error rate, and/or the difference between the first time and the second time. For example, as described above with reference to operation 230, the data integrity manager 113 can read data from flagged subsets of memory and reprogram the data (once corrected) to different subsets of memory according to a determined priority order. Other remedial actions include a change of bit density of memory cells in the subset of memory, a change of data type stored in the subset of memory, adding the subset of memory to a high reliability pool of memory, and an adjustment in a rate of data integrity scans of the subset of memory.

For example, in response to the data integrity manager 113 determining that QLC Block 150 has a bit error rate that does not satisfy the error rate threshold and that QLC Block 150 only had a 35-bit increase in bit error rate over five days, the data integrity manager 113 can identify QLC Block 250 as having high retention/reliability characteristics. As such, the data integrity manager 113 can add QLC Block 150 to a high reliability pool of memory that stores critical data. Alternatively, the data integrity manager 113 can flag QLC Block 150 for storing a different data type, such as cold data that is not often reprogrammed or other data that is stored for a long period of time. Additionally, or alternatively, the data integrity manager 113 can flag QLC Block 150 for less frequent data integrity scans.

As another example, in response to the data integrity manager 113 determining that QLC Block 250 has a bit error rate that satisfies the error rate threshold and that QLC Block 250 had a 90-bit increase in bit error rate just one day, the data integrity manager 113 can identify QLC Block 250 as having low retention/reliability characteristics. As such, in addition to reprogramming data from QLC Block 250, the data integrity manager 113 can flag the block for change of bit density of memory cells (e.g., downgrading the block from a QLC block to a TLC block, MLC block, or SLC block). Additionally, or alternatively, the data integrity manager 113 can flag QLC Block 250 for more frequent data integrity scans.

As another example, in response to the data integrity manager 113 determining that QLC Block 350 has a bit error rate that satisfies the error rate threshold and that QLC Block 350 had a 93-bit increase in bit error rate four days, the data integrity manager 113 can identify QLC Block 350 has having moderate data retention/reliability characteristics. As such, the data integrity manager 113 continues to use QLC Block 350 at the current bit density (i.e., QLC storage) but can flag QLC Block 350 for storing a different data type, such as hot data that is often reprogrammed or other data that is stored for a short period of time.

In one embodiment, the data integrity manager 113 uses a comparison of the rate of change in bit error rate for a subset of memory to a threshold value to select one or more remedial actions. For example, the data integrity manager 113 can select (1) a change of bit density of memory cells in the subset of memory when the rate of change in bit error rate for a subset of memory satisfies a first threshold, (2) a change of data type stored in the subset of memory when the rate of change in bit error rate for a subset of memory satisfies a second threshold, (3) the addition of the subset of memory to a high reliability pool of memory when the rate of change in bit error rate for a subset of memory satisfies a third threshold, and (4) an adjustment in a rate of data integrity scans of the subset of memory when the rate of change in bit error rate for a subset of memory satisfies a fourth threshold.

Figure 3:
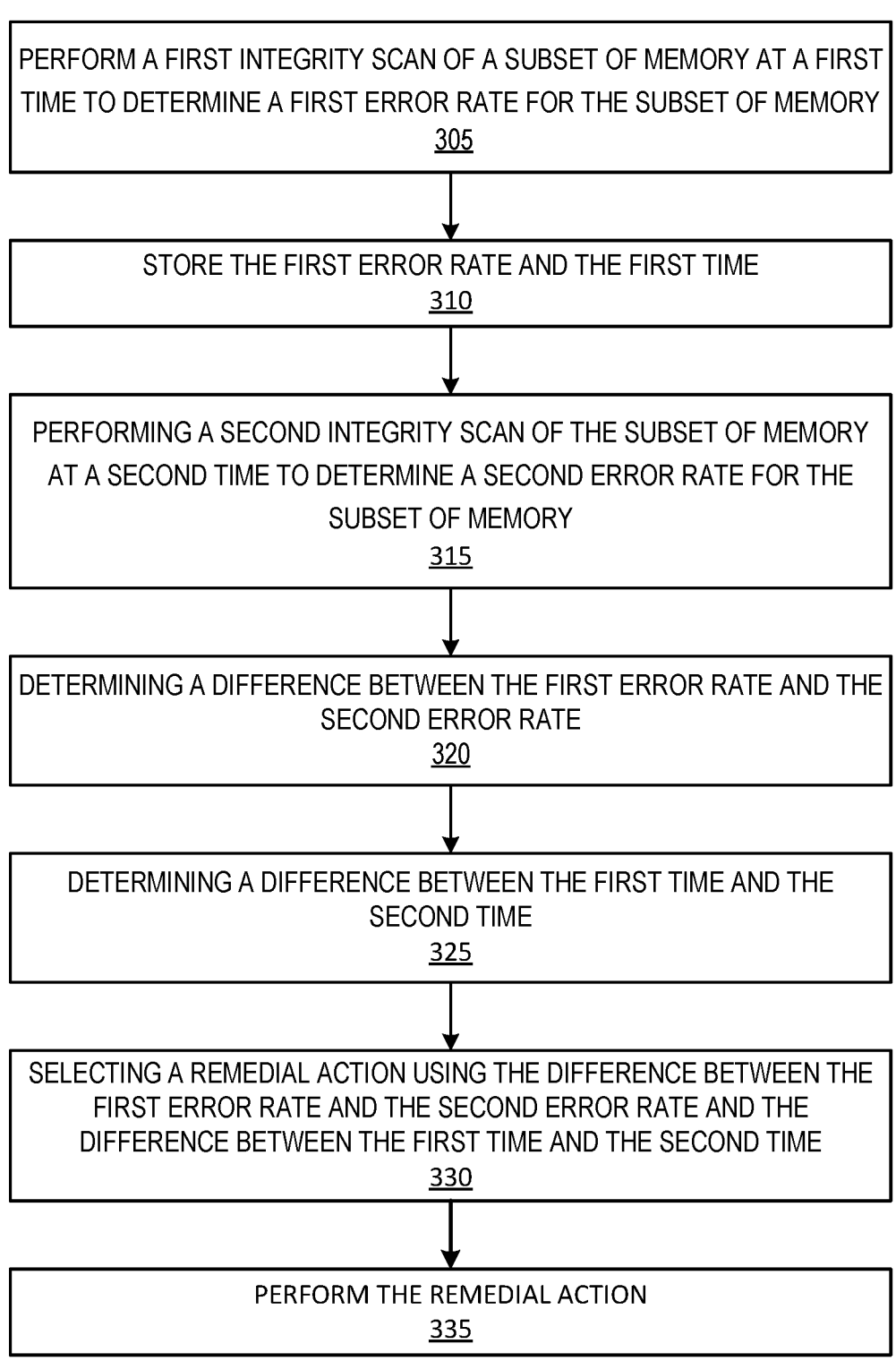
FIG. 3 is a flow diagram of another example method to manage data integrity using a change in a number of data errors and an amount of time in which the change occurred in accordance with some embodiments of the present disclosure.

FIG. 3 is a flow diagram of an example method 300 to manage data integrity using a change in a number of data errors and an amount of time in which the change occurred, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the data integrity manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device performs an initial data integrity scan of a subset of memory at an initial time to determine an initial error rate for the subset of memory. For example, the data integrity manager 113 can perform the initial data integrity scan as described above with reference to operation 205.

At operation 310, the processing device stores the initial error rate and the initial data integrity scan time. For example, the data integrity manager 113 stores the data integrity scan data as described above with reference to operation 210.

At operation 315, the processing device performs a subsequent data integrity scan of the subset of memory. For example, the data integrity manager 113 can perform the subsequent data integrity scan as described above with reference to operation 215.

At operation 320, the processing device determines a difference between the initial error rate and the subsequent error rate. For example, the data integrity manager 113 determines this difference as described above with reference to operation 220.

At operation 325, the processing device determines a difference between the first time and the second time. For example, the data integrity manager 113 determines this difference as described above with reference to operation 220.

At operation 330, the processing device selects a remedial action using the difference between the initial error rate and the subsequent error rate and the time elapsed between data integrity scans. For example, the data integrity manager 113 selects a remedial action as described above with reference to operations 225-235.

At operation 335, the processing device performs the selected remedial action. For example, the data integrity manager 113 performs one or more remedial actions as above with reference to operation 235.

Figure 4:
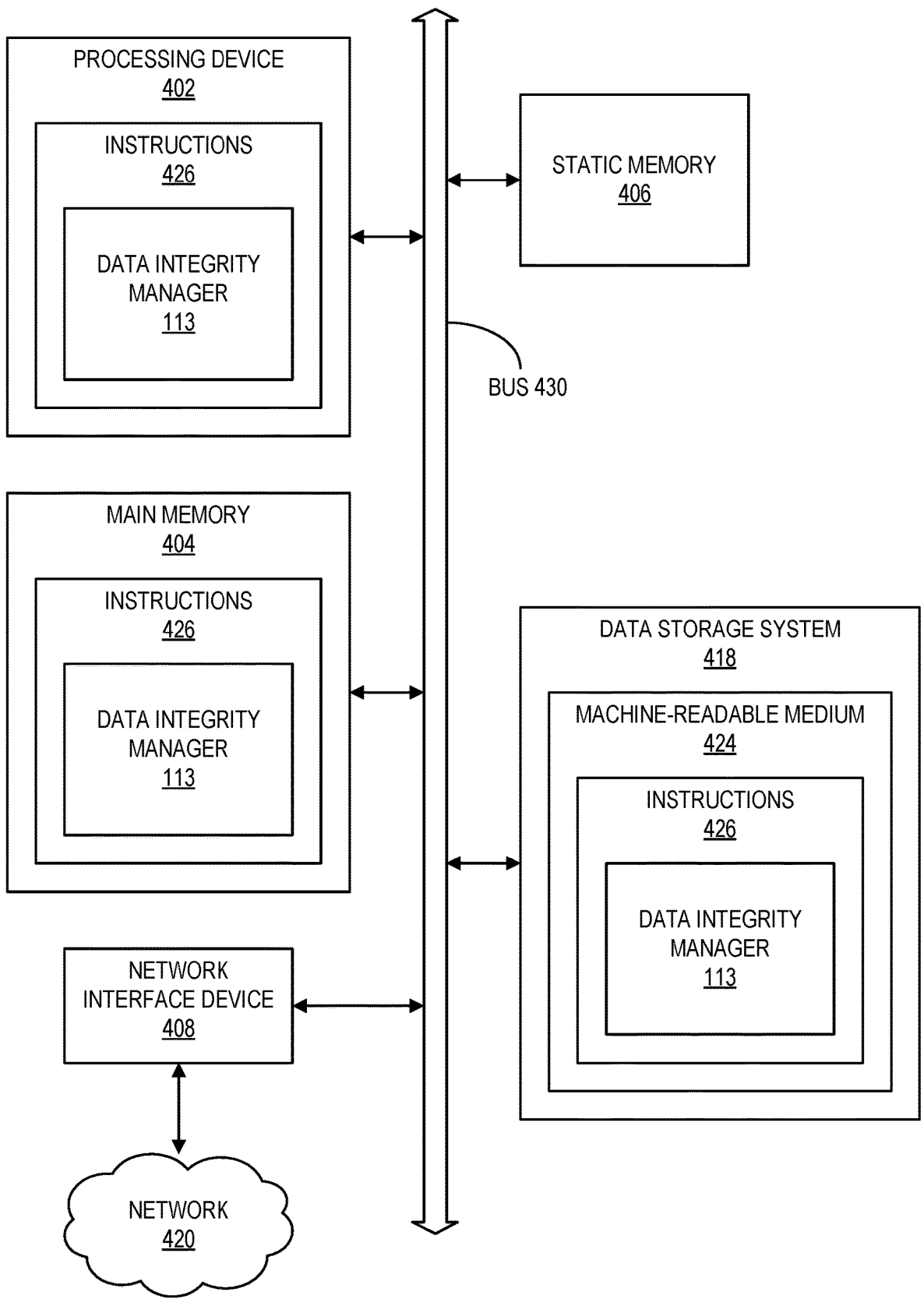
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the data integrity manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory subsystem 110 of FIG. 1.

In one embodiment, the instructions 426 include instructions to implement functionality corresponding to a data integrity manager (e.g., the data integrity manager 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
performing a first integrity scan of a subset of memory at a first time to determine a first error rate for the subset of memory;
storing the first error rate and the first time;
performing a second integrity scan of the subset of memory at a second time to determine a second error rate for the subset of memory;
determining a difference between the first error rate and the second error rate;
determining a difference between the first time and the second time;
selecting a remedial action using the difference between the first error rate and the second error rate and the difference between the first time and the second time; and
performing the remedial action.

2. The method of claim 1, further comprising:
determining the second error rate satisfies a rate threshold, wherein the remedial action includes reprogramming data from the subset of memory to a different subset of memory.

3. The method of claim 1, wherein selecting the remedial action includes prioritization of the remedial action relative to another remedial action for a different subset of memory.

4. The method of claim 1, wherein the remedial action includes a change of bit density of memory cells in the subset of memory.

5. The method of claim 1, wherein the remedial action includes a change of data type stored in the subset of memory.

6. The method of claim 1, wherein the selecting further uses a determination that the second error rate does not satisfy a rate threshold, and wherein the remedial action is adding the subset of memory to a high reliability pool of memory.

7. The method of claim 1, wherein the remedial action is an adjustment in a rate of data integrity scans of the subset of memory.

8. A non-transitory computer-readable storage medium comprising instructions that, when executed by a processing device, cause the processing device to:
- perform a first integrity scan of a subset of memory at a first time to determine a first error rate for the subset of memory;
- store the first error rate and the first time;
- perform a second integrity scan of the subset of memory at a second time to determine a second error rate for the subset of memory;
- determine a difference between the first error rate and the second error rate;
- determine a difference between the first time and the second time;
- select a remedial action using the difference between the first error rate and the second error rate and the difference between the first time and the second time; and
- perform the remedial action.

9. The non-transitory computer-readable storage medium of claim 8, wherein the processing device is further to:
- determine the second error rate satisfies a rate threshold, wherein the remedial action includes reprogramming data from the subset of memory to a different subset of memory.

10. The non-transitory computer-readable storage medium of claim 8, wherein selecting the remedial action includes prioritization of the remedial action relative to another remedial action for a different subset of memory.

11. The non-transitory computer-readable storage medium of claim 8, wherein the remedial action includes a change of bit density of memory cells in the subset of memory.

12. The non-transitory computer-readable storage medium of claim 8, wherein the remedial action includes a change of data type stored in the subset of memory.

13. The non-transitory computer-readable storage medium of claim 8, wherein the selecting further uses a determination that the second error rate does not satisfy a rate threshold, and wherein the remedial action is adding the subset of memory to a high reliability pool of memory.

14. The non-transitory computer-readable storage medium of claim 8, wherein the remedial action is an adjustment in a rate of data integrity scans of the subset of memory.

15. A system comprising:
a plurality of memory devices; and
a processing device, operatively coupled with the plurality of memory devices, to:
- perform a first integrity scan of a subset of memory at a first time to determine a first error rate for the subset of memory;
- store the first error rate and the first time;
- perform a second integrity scan of the subset of memory at a second time to determine a second error rate for the subset of memory;
- determine a difference between the first error rate and the second error rate;
- determine a difference between the first time and the second time;
- select a remedial action using the difference between the first error rate and the second error rate and the difference between the first time and the second time, wherein selecting the remedial action includes prioritization of the remedial action relative to another remedial action for a different subset of memory; and
- perform the remedial action.

16. The system of claim 15, wherein the processing device is further to:
- determine the second error rate satisfies a rate threshold, wherein the remedial action includes reprogramming data from the subset of memory to a different subset of memory.

17. The system of claim 15, wherein the remedial action includes a change of bit density of memory cells in the subset of memory.

18. The system of claim 15, wherein the remedial action includes a change of data type stored in the subset of memory.

19. The system of claim 15, wherein the selecting further uses a determination that the second error rate does not satisfy a rate threshold, and wherein the remedial action is adding the subset of memory to a high reliability pool of memory.

20. The system of claim 15, wherein the remedial action is an adjustment in a rate of data integrity scans of the subset of memory.

* * * * *